(12) United States Patent
Oechsle

(10) Patent No.: US 7,498,756 B2
(45) Date of Patent: Mar. 3, 2009

(54) BRAKING SYSTEM FOR ELECTRIC STEP MOTORS

(75) Inventor: Jan Oechsle, Ishoej (DK)

(73) Assignee: Martin Professional A/S, Aarhus N (DK)

( * ) Notice: Subject to any disclaimer, the term of this patent is extended or adjusted under 35 U.S.C. 154(b) by 0 days.

(21) Appl. No.: 11/557,653

(22) Filed: Nov. 8, 2006

(65) Prior Publication Data

US 2007/0145937 A1    Jun. 28, 2007

(30) Foreign Application Priority Data

Nov. 8, 2005    (DK) ............................... 2005 01544

(51) Int. Cl.
*H02K 7/10*    (2006.01)

(52) U.S. Cl. ................ 318/371; 318/370; 318/375; 362/43; 362/466

(58) Field of Classification Search ............. 318/696, 318/370–376; 362/282, 466, 464
See application file for complete search history.

(56) References Cited

U.S. PATENT DOCUMENTS

| | | | |
|---|---|---|---|
| 3,873,881 A * | 3/1975 | Inoue | 315/82 |
| 4,129,816 A * | 12/1978 | Feldy et al. | 318/696 |
| 4,140,955 A * | 2/1979 | Drabing | 318/696 |
| 4,179,646 A | 12/1979 | Russell | |
| 4,329,635 A * | 5/1982 | Reilly | 318/696 |
| 4,612,490 A * | 9/1986 | Kagi | 318/761 |
| 4,620,267 A * | 10/1986 | Cibie | 362/466 |
| 4,808,969 A * | 2/1989 | Human | 340/468 |
| 4,896,084 A * | 1/1990 | Maue et al. | 318/280 |
| 5,184,024 A * | 2/1993 | Hussmann et al. | 307/10.8 |
| 5,404,278 A * | 4/1995 | Shibata et al. | 362/464 |
| 5,410,456 A * | 4/1995 | Shibata et al. | 362/40 |
| 5,796,175 A * | 8/1998 | Itoh et al. | 307/10.1 |
| 5,821,476 A * | 10/1998 | Hakala et al. | 187/290 |
| 6,081,086 A * | 6/2000 | Roth-Stielow et al. | 318/375 |
| 6,213,571 B1 * | 4/2001 | Yamada et al. | 303/152 |
| 6,646,851 B1 * | 11/2003 | Gudat | 361/160 |
| 6,729,749 B2 * | 5/2004 | Kondo et al. | 362/466 |
| 2003/0031008 A1 * | 2/2003 | Kobayashi | 362/37 |
| 2004/0114369 A1 * | 6/2004 | Layman | 362/282 |
| 2006/0039131 A1 * | 2/2006 | Nakazawa et al. | 362/43 |

FOREIGN PATENT DOCUMENTS

| | | |
|---|---|---|
| JP | 6121594 A | 4/1994 |
| JP | 8322295 A | 12/1996 |

* cited by examiner

*Primary Examiner*—Paul Ip
(74) *Attorney, Agent, or Firm*—David S. Safran; Roberts Mlotkowski Safran & Cole, P.C.

(57) ABSTRACT

A braking system for electric step motors that operate in conjunction with a light assembly, including a moving head for pan or tilt thereof or for moving internal optical components. The step motors are connected to driving means to reduce movement speed of the moving head during power down and are connected through switches with a first operating position to connect the driving means to the step motors, and with a second power down position to establish a current path through a motor winding. Movements after power down take place very slowly and without generating noise for use in a theatre where the lamp may be switched off because a fuse burn out, and so cease operation without making disturbing noise. In a controlled power down, noise is reduced when several lamp fixtures placed side by side at the same time move to a stop position.

7 Claims, 1 Drawing Sheet

BRAKING SYSTEM FOR ELECTRIC STEP MOTORS

BACKGROUND OF THE INVENTION

1. Field of the Invention

The present invention concerns a braking system for electric step motors, which step motors operate in conjunction with a light assembly comprising a moving head for pan or tilt of the light assembly or operating in the lamp for moving internal optical components, which step motors during operation are connected to driving means.

2. Description of Related Art

U.S. Pat. No. 4,179,646 describes a circuit breaker motor operator control circuit which utilizes the voltage developed across a dynamic braking resistor during breaking of a permanent magnet DC motor to prevent re-energization of the motor until it has been braked to a virtual stop. The control circuit also includes a timing network operating to prevent continued pumping of the breaker operating mechanism by the motor operator should the operating mechanism for some reason fail to become charged within a prescribed time period.

JP 8322295 concerns a stepping motor which can stop rotation perfectly when a power supply is cut off. If energization of a driver is cut off, a stepping motor is put into a non-exciting state and, at the same time, relays are opened. As a result, closed circuits are composed of windings of the step motor is established. If a force is applied to the rotary shaft of the stepping motor in this state and the permanent magnets of a rotor are turned, induced currents are respectively applied to the closed circuits composed of the respective windings and magnetic forces are generated between the respective windings and the permanent magnets of the rotor so as to produce interactions between the windings and magnets, so that the rotor is braked.

The stepping motor described in JP 8322295 is used in a ball counter in a ball rental machine installed in an amusement center. This JP application is from a different technical field, far from light assemblies comprising moving heads.

SUMMARY OF THE INVENTION

It is the scope of the invention to reduce the speed of movement of moving head light fixtures during a power down. A further scope of the invention is to avoid electronic disturbance in power down situations of a lamp assembly.

This can be achieved if the step motors are connected through switches, which switches in a first position during operation connect the driving means to the step motors, where at a power down, the switches change to a second position, in which second position the switches establish a current path through at least one motor winding.

It is hereby achieved that all movements after power down of the moving head as well as internal movement take place very slowly and without generating noise. This is important if a light fixture for example used in a theatre where this lamp occasionally may be switched off maybe because a fuse burns out, the lamp will stop the operation without making any noise that disturbs the theatre. Also at a controlled power down where several lamp fixtures are placed side by side, it is very noisy if all these lamps at the same time moves to a stop position.

Also inside in the light fixture seen from the electronic point of view, the breaking system improves the lamp. If no breaking circuit is established, the rotating motors will generate current in their windings which can generate a relatively high voltage somewhere in an electric circuit where semiconductor components by this over voltage are damaged.

The switches can be relay switches, which relay switches are in the first position if energized, which relay switches are in the second position if not energized. It is hereby achieved that the relay switches in normal operation switch the motor windings into a normal connection to the motor driving circuits. At a power down, the relay is de-energized, and it switches automatically into the second position, where it remains until the next power up takes place. This means that a breaking circuit will be established during all kinds of handling and transportation of a light fixture. This protects the electronic circuits inside the light fixture so that an occasional turning of a motor will not lead to any destructive voltage generation inside the light fixture.

Alternatively, the switches can be semiconductor switches. The semiconductor switches can be activated much faster than any relay switches. In a normal operation, semiconductor switches can operate just as effectively as the relay switches. In a power down situation, it will be easy to switch off the switches and also to let other switches be switched on, but the switched on semiconductors will have a kind of power consumption as there is a power down of the light fixture. It can be easy to achieve a primitive and simple power supply that can supply the semiconductor switches with current for a certain period of time. This period could be up to a few hours, but if a longer period is needed, further improvements in the power supply which then could comprise batteries could let the system operate for a very long period of time.

The current path can preferably be established by current regulation means. The current regulation means will reduce the current flowing in the motor windings. This will protect the motor winding if occasionally active forces are trying to move a light fixture rapidly in its pan or tilt movement. Then it will be very important that the maximum current that is allowed into the motor windings is regulated to be kept inside a safety value.

The current regulation means can comprise a voltage regulation circuit. By regulating the voltage, it is possible to use the power that is generated after a power down for charging for example a capacitor that could be used as a power supply for the semiconductor switches in the breaking circuit.

The voltage regulation circuit is connected to an electronic circuit. It is hereby achieved that an electronic circuit for charging a kind of safety backup batteries can be connected to the braking circuit.

DETAILED DESCRIPTION OF THE INVENTION

Figure 1:
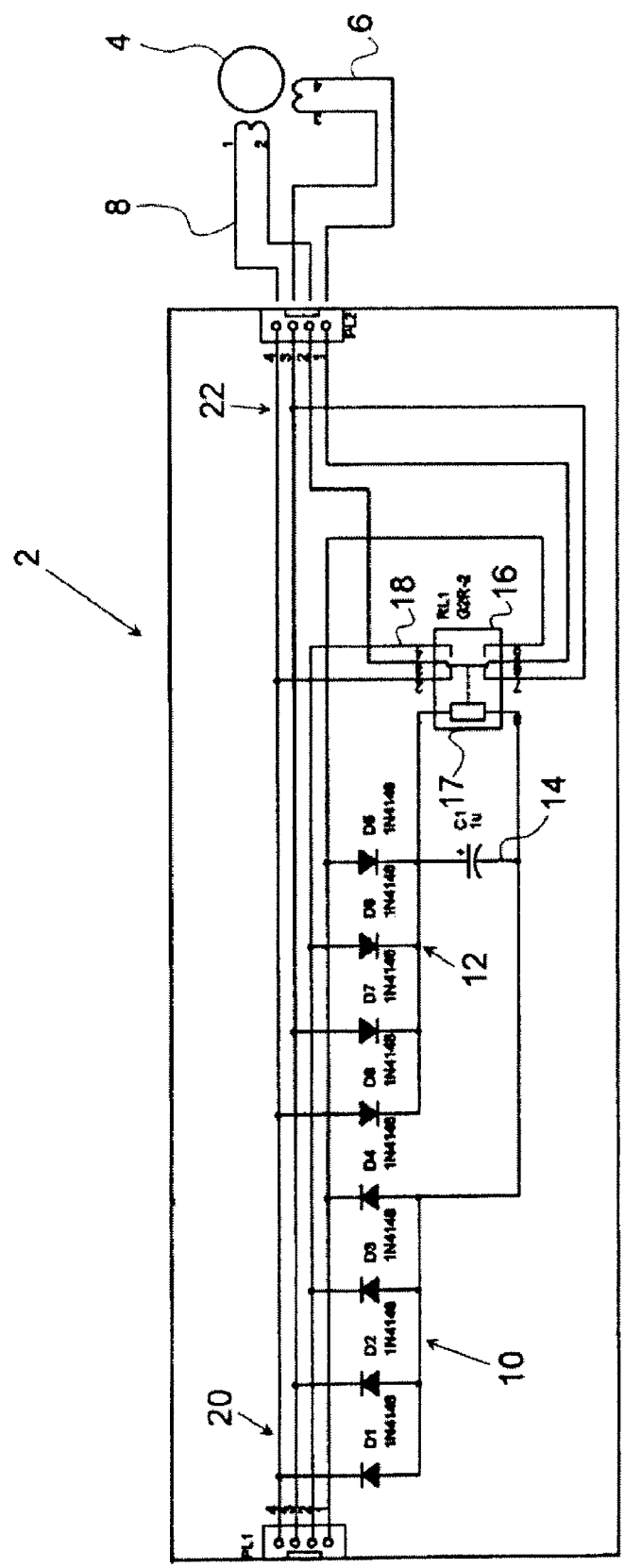
FIG. 1 shows an exemplary braking system for electric step motors, according to the present invention.

FIG. 1 shows one possible embodiment of the invention. The FIGURE shows an active motor braking system 2 which is connected to a motor 4 which motor has motor windings 6, 8. The braking system 2 comprises diodes 10, 12 which are connected to input lines 20. The current passing through the diodes 10, 12 is led to a capacitor 14 which is connected to a relay 16 which has a coil 17 and switches 18. Depending on the switches 18, the power connection from the lines 20 are sent to the switches 18 directly into the power lines 22 which connect to the windings 6, 8 of the motor. In a situation where the power lines 20 are de-energized by switching off the circuit, there will no longer flow any current through the diodes 10, 12, and the capacitor 14 will be discharged. Then the current flowing through the relay coil 17 will be reduced, and the switches 18 will switch into the second position. In the second position, the power line 22 is short-circuited in the relay switches 18.

By this, a very effective slow braking action of the step motor will be achieved.

The invention claimed is:

1. Braking system for light assemblies with moving heads, and having electric step motors, the braking system comprising:
   a switch for connecting to a step motor,
   wherein the switch in a first position during operation connects the step motor to an electronic driving means,
   the switch at a power down changes to a second position,
   in the second position the switch establishes a current path through at least one motor winding in the step motor, and short circuit a power line connected to a winding of the motor and the switch,
   the step motor operates in a light assembly comprising a moving head, and
   the moving head uses the step motor for at least pan or tilt of the light assembly.

2. Braking system according to claim 1, wherein the switch is a relay switch, the relay switch is in the first position if energized, and the relay switch is in the second position if not energized.

3. Braking system according to claim 1, wherein the relay switch is a semiconductor switch.

4. Braking system according to claim 1 or 2, wherein the current path is established by a current regulation means.

5. Braking system according to claim 4, wherein the current regulation means comprises a voltage regulation circuit.

6. Braking system according to claim 5, wherein the voltage regulation circuit is connected to an electronic circuit.

7. Braking system according to claim 1, wherein the step motor operates in the lamp for moving internal optical components thereof.

\* \* \* \* \*